United States Patent
Sakai

(10) Patent No.: US 10,545,505 B2
(45) Date of Patent: Jan. 28, 2020

(54) TRAJECTORY PLAN MODIFICATION FOR AN AUTONOMOUS VEHICLE OPERATION IN A HETEROGENEOUS VEHICLE ENVIRONMENT

(71) Applicant: Toyota Research Institute, Inc., Los Altos, CA (US)

(72) Inventor: Katsuhiro Sakai, Ann Arbor, MI (US)

(73) Assignee: Toyota Research Institute, Inc, Los Altos, CA (US)

( * ) Notice: Subject to any disclaimer, the term of this patent is extended or adjusted under 35 U.S.C. 154(b) by 138 days.

(21) Appl. No.: 15/688,372

(22) Filed: Aug. 28, 2017

(65) Prior Publication Data

US 2019/0064839 A1 Feb. 28, 2019

(51) Int. Cl.
| | | |
|---|---|---|
| G05D 1/02 | (2006.01) | |
| G01S 17/02 | (2006.01) | |
| G08G 1/16 | (2006.01) | |

(52) U.S. Cl.
CPC .......... *G05D 1/0248* (2013.01); *G01S 17/023* (2013.01); *G08G 1/16* (2013.01); *G05D 2201/0213* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,295,551 A | * | 3/1994 | Sukonick | B62D 1/28 180/167 |
| 8,457,827 B1 | | 6/2013 | Ferguson et al. | |
| 9,304,515 B2 | | 4/2016 | Cudak et al. | |
| 2010/0256835 A1 | * | 10/2010 | Mudalige | G08G 1/163 701/2 |
| 2013/0211624 A1 | * | 8/2013 | Lind | G05D 1/0278 701/2 |
| 2014/0005906 A1 | | 1/2014 | Pandita et al. | |
| 2014/0358841 A1 | | 12/2014 | Ono | |
| 2015/0127189 A1 | * | 5/2015 | Mehr | B60W 30/165 701/1 |

(Continued)

OTHER PUBLICATIONS

Unknown, Cooperative Planning for Teams of Heterogeneous Autonomous Vehicles, University of Washington (Date Unknown) printed on Mar. 27, 2017 from https://www.aa.washington.edu/research/afsl/research/strategic/ecops> in 6 pages.

*Primary Examiner* — Rami Khatib

(74) *Attorney, Agent, or Firm* — Christopher G. Darrow; Darrow Mustafa PC

(57) ABSTRACT

A method and device for an autonomous vehicle operation in a heterogeneous vehicle environment are disclosed, where sensing, based on vehicle sensor data, a vehicle travelling ahead, and trajectory request for trajectory information of the vehicle can be transmitted. Based on a response by the vehicle to the trajectory request, determining a certainty estimate value for a trajectory of the vehicle. With the certainty estimate value, selecting a distance buffer proportional to the certainty estimate value for the autonomous vehicle operation in relation to the vehicle, and modifying a trajectory plan of the autonomous vehicle operation to produce a modified trajectory plan based on the distance buffer for modifying the autonomous vehicle operation.

18 Claims, 5 Drawing Sheets

(56) References Cited

U.S. PATENT DOCUMENTS

| | | | | |
|---|---|---|---|---|
| 2015/0177007 A1* | 6/2015 | Su | ............ | G01C 21/34 |
| | | | | 701/25 |
| 2015/0375744 A1* | 12/2015 | Kato | ............ | B60W 30/16 |
| | | | | 701/96 |
| 2016/0272207 A1 | 9/2016 | Dolgov et al. | | |
| 2017/0166207 A1* | 6/2017 | Darms | ............ | B60W 30/165 |
| 2017/0168503 A1* | 6/2017 | Amla | ............ | G05D 1/0011 |
| 2017/0168504 A1* | 6/2017 | Darms | ............ | G01C 21/00 |
| 2018/0367613 A1* | 12/2018 | Regmi | ............ | H04L 67/12 |

* cited by examiner vehicle control unit 110

TRAJECTORY PLAN MODIFICATION FOR AN AUTONOMOUS VEHICLE OPERATION IN A HETEROGENEOUS VEHICLE ENVIRONMENT

FIELD

The subject matter described herein relates in general to devices for carrying out autonomous vehicle trajectory plans and, more particularly, to modifying a trajectory plan for an autonomous vehicle operation in a heterogeneous vehicle environment having a combination vehicles with different levels of autonomous operational capabilities.

BACKGROUND

Generally, autonomous vehicle operations may be based on various computing systems to aid in autonomously transporting passengers from one location to another along a travel route. A vehicle environment for the travel route may be a homogenous vehicle environment in which vehicles generally have similar autonomous operational capabilities to promote communication and movement coordination between the vehicles. On the other hand, the travel route may be a heterogeneous environment in which the vehicles generally are a mix of autonomous operational capabilities (that may include vehicles with no autonomous operational capabilities). This mix may decrease the efficiency of a high-level autonomous (or fully-autonomous) vehicle to timely traverse a travel route, without incident, because of a general need to constantly address and/or monitor the unpredictable actions of other vehicles. Accordingly, a device and method are desired to improve the operational efficiency of a high-level autonomous vehicle to traverse a travel route in such heterogeneous vehicle environments having vehicles that may lack systems and/or mechanisms for similar high-level autonomous vehicle operations.

SUMMARY

A device and methods for modifying a trajectory plan for an autonomous vehicle operation in a heterogeneous vehicle environment that includes a mix of vehicles with lower-level and/or no autonomous operational capabilities are disclosed.

In one implementation, a method for an autonomous vehicle operation in a heterogeneous vehicle environment is disclosed. The method includes sensing, based on vehicle sensor data, a vehicle travelling ahead, and transmitting a trajectory request for trajectory information of the vehicle. Based on a response by the vehicle to the trajectory request, determining a certainty estimate value for a trajectory of the vehicle. With the certainty estimate value, selecting a distance buffer proportional to the certainty estimate value for the autonomous vehicle operation in relation to the vehicle, and modifying a trajectory plan of the autonomous vehicle operation to produce a modified trajectory plan based on the distance buffer for modifying the autonomous vehicle operation.

In another implementation, a vehicle control unit for an autonomous vehicle operation in a heterogeneous vehicle environment is disclosed. The vehicle control unit includes a wireless communication interface to service communication with a vehicle network and other vehicles, a processor communicably coupled to the wireless communication interface and to a plurality of vehicle sensor devices, and memory communicably coupled to the wireless communication interface and storing a vehicle detection module, and a trajectory plan modification module. The vehicle detection module includes instructions, that when executed by the processor, cause the processor to sense, based on vehicle sensor data, a vehicle travelling ahead, and transmit a trajectory request for trajectory information of the vehicle. The trajectory plan modification module includes instructions that, when executed by the processor, cause the processor to, determine a certainty estimate value for a trajectory of the vehicle based on the response, and with the certainty estimate value, select a distance buffer in proportion for the autonomous vehicle operation in relation to the vehicle. The trajectory plan modification module includes instructions that, when executed by the processor cause the processor to modify a trajectory plan of the autonomous vehicle operation to produce a modified trajectory plan based on the distance buffer.

BRIEF DESCRIPTION OF THE DRAWINGS

The description makes reference to the accompanying drawings wherein like reference numerals refer to like parts throughout the several views, and wherein.

DETAILED DESCRIPTION

Autonomous vehicle trajectory plan modification for a heterogeneous vehicle environment is described here.

One example method includes sensing based on vehicle sensor data, a vehicle travelling ahead of a vehicle having an autonomous vehicle operation. As may be appreciated, the heterogeneous vehicle environment may include vehicles capable of autonomous operations, such as autonomous vehicles and in some instances driver-assist vehicles (that is, some autonomous operation may exist in aiding a vehicle operator), and a manually-operated vehicle.

In this respect, the response may convey the operational capability of the vehicle and related operational certainty. For example, a trajectory plan response may relay that the vehicle is another vehicle with a full set of autonomous vehicle operations. A near real time trajectory response may indicate a driver-assist vehicle with a partial set of autonomous vehicle operations. The near real time trajectory response including near real time operational parameters of the vehicle, such as at least one of vehicle heading data, vehicle speed data, vehicle lane control data, vehicle steering wheel angle data, and vehicle braking data. A null response, which be an affirmative and/or inferred "none" response, may indicate a manually-operated vehicle.

Based on the response to the trajectory request by the vehicle, the autonomous vehicle may determine a certainty estimate value for a trajectory of the vehicle, and select a distance buffer proportional thereto for the autonomous vehicle operation in relation to the preceding vehicle. With the distance buffer, trajectory plan may be modified to produce a modified trajectory plan based on the distance buffer.

In this respect, the autonomous vehicle operation may execute the modified trajectory plan based on a presence of vehicles that are not autonomously operated.

Figure 1:
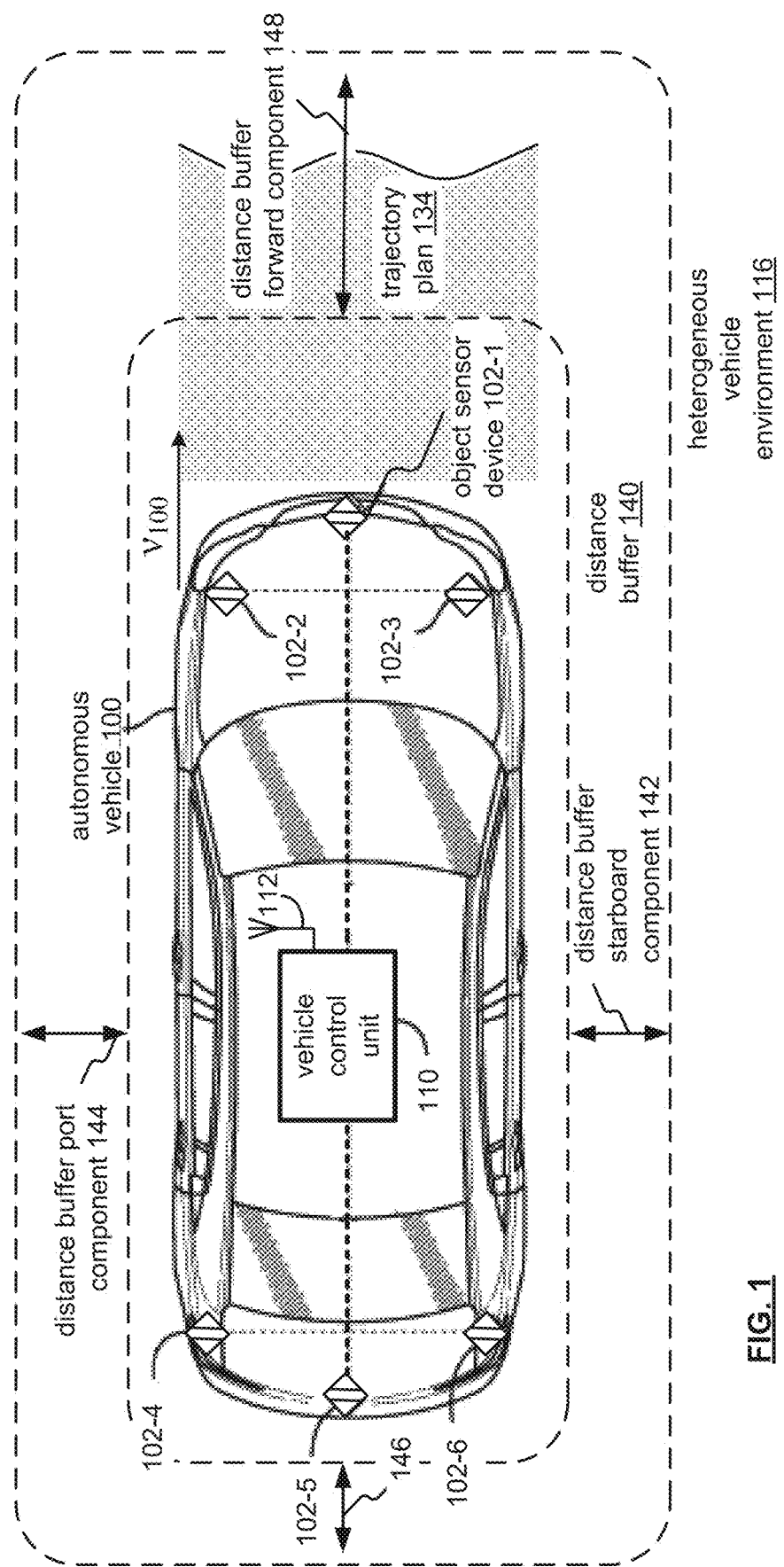
FIG. 1 is a schematic illustration of a vehicle including a vehicle control unit.

FIG. 1 is a schematic illustration of a vehicle 100 including a vehicle control unit 110. A plurality of object sensor devices 102-1, 102-2, 102-3, 102-4, 102-5 and 102-6 (generally, object sensor devices 102) are in communication with the control unit 110 to access a heterogeneous vehicle environment 116. As may be appreciated, the vehicle 100 may also be an automobile, light truck, cargo transport, or any other passenger or non-passenger vehicle.

In an autonomous operation, the vehicle control unit may operate to define a distance buffer 140. The distance buffer may be dimensionally defined as relating to the autonomous vehicle 100. For example, the outer boundary as defined by the vehicle control unit may be symmetrical or asymmetrical, as well as including a varying buffer area around the vehicle 100 based upon conditions of the heterogeneous vehicle environment 116.

For example, an automobile generally operates and/or navigates in a two-dimensional space with other automobiles. An aircraft generally operates and/or navigates in a three-dimensional space with other aircraft. For the example of FIG. 1, the distance buffer 140 may accommodate two-dimensional space relative to the autonomous vehicle 100 laterally (that is, across the autonomous vehicle 100) and longitudinally (that is, along the length of the autonomous vehicle 100). The distance buffer 140 may include a distance buffer starboard component 142 and a distance buffer port component 144 relating to a lateral space of the autonomous vehicle 100. The distance buffer 140 may also include a distance buffer aft component 146 and a distance buffer forward component 148 relating to a longitudinal space of the autonomous vehicle 100. The distance buffer 140 may be defined on a Cartesian coordinate system basis and/or a polar coordinate system basis.

As may be appreciated, the vehicle control unit 110 may define zones for the distance buffer 140. Such zones may be ranked, for example, on the magnitude another vehicle may have on the trajectory path 134 for the autonomous vehicle. Generally, other vehicles ahead of the vehicle 100 may have a greater effect on the trajectory path 134 than those behind the vehicle 100. Accordingly, the zone of the distance buffer 140 relating to the distance buffer forward component 148, and in this regard, provide a larger buffer value as compared with that of the distance buffer aft component 146.

In operation, the vehicle control unit 110 may base components 142, 144, 146 and 148 of the distance buffer 140 on a certainty estimate value for a trajectory of other vehicles that may affect the trajectory plan 134. For example, a trajectory of a manually-operated vehicle may be generally unpredictable by the vehicle control unit 110 because observed vehicle behavior may be based on the object sensor devices 102, while a trajectory of another autonomous vehicle may be generally predictable by the vehicle control unit 110 because autonomous vehicle behavior may be based on the object sensor devices 102 and vehicle-to-vehicle communication data (such as, for example, other autonomous vehicles' trajectory plans, speed, heading, etc.).

Based on a certainty estimate value for a trajectory of a preceding vehicle, the vehicle control unit may select a distance buffer 140 being proportional to the certainty estimate value for operation of the autonomous vehicle 100 in relation to the another vehicle. The vehicle control unit 110 may modify the trajectory plan 134 of the autonomous vehicle 100 to produce a modified trajectory plan based on the distance buffer 140, which in turn may operate to modify operation of the autonomous vehicle 100, as is discussed in detail with reference to FIGS. 2-5.

The plurality of object sensor devices 102 may be positioned on the outer surface of the vehicle 100, or may be positioned in a concealed fashion for aesthetic purposes with regard to the vehicle. Moreover, the sensors may operate at frequencies in which the vehicle body or portions thereof appear transparent to the respective sensor device.

Communication between sensor devices and vehicle control units, including vehicle control unit 110, may be on a bus basis, and may also be used or operated by other systems of the vehicle 100. For example, the object sensor devices 102 may be coupled by a combination of network architectures such as a Body Electronic Area Network (BEAN), a Controller Area Network (CAN) bus configuration, an Audio Visual Communication-Local Area Network (AVC-LAN) configuration, and/or other combinations of additional communication-system architectures to provide communications between devices and systems of the vehicle 100.

Outputs of the example object sensor devices 102 may be used by the vehicle control unit 110 to detect vehicle lane boundaries for a roadway, objects in a vehicle route 134, capture live video of the vehicle environment 116, determine a vehicle velocity, etc.

The object sensor devices 102, by way of example, may operate to provide tactile or relational changes of the heterogeneous vehicle environment 116, such as an approaching pedestrian, cyclist, object, vehicle, road debris, and other such vehicle obstacles (or potential vehicle obstacles) such as a preceding vehicle and/or a vehicle ahead of the vehicle 100, as is discussed in detail with reference to FIGS. 1-5.

The object sensor devices 102 may be provided by a Light Detection and Ranging (LIDAR) system, in which the object sensor devices 102 may capture data related to laser light returns from physical objects in the environment of the vehicle 100. The object sensor devices 102 may also include a combination of lasers (LIDAR) and milliwave radar devices. LIDAR and radar based devices may operate to sense objects along with a velocity (that is, relative and/or absolute velocities) of the objects.

The object sensor devices 102 may, alone or in combination, operate to capture depth images or otherwise generating depth information for a captured image. For example, the object sensor devices 102 may configured to capture images (visual and non-visual spectrum wavelengths, audible and non-audible wavelengths, etc.).

In this respect, the object sensor devices 102 are operable to determine distance vector measurements of objects of the heterogeneous vehicle environment 116. For example, each of the object sensor devices 102 may be configured to sense and/or analyze structured light, time of flight (e.g., of signals for Doppler sensing), light detection and ranging (LIDAR), light fields, and other information to determine depth/distance, direction and/or velocity of objects.

In operation, objects such as terrain, foliage, pedestrians, etc., may be detected using multiples of the object sensor devices 102-1 through 102-6 in combination or independently for assessing the heterogeneous vehicle environment 116 longitudinally and/or laterally with respect to the vehicle 100. In one example, object sensor devices 102-1, 102-2, and 102-3 may operate longitudinally to detect objects ahead of the vehicle 100, such as may be used to assess a distance buffer forward component 148, and object sensor devices 102-4, 102-5 and 102-6 may operate to detect objects longitudinally behind the vehicle 100, such as may be used to assess a distance buffer aft component 146.

As a further example, object sensor devices 102-3 and 102-6 may operate laterally to detect objects laterally starboard of the vehicle 100, such as may be used to assess a distance buffer starboard component 142, and object sensor devices 102-2 and 102-4 may operate to detect objects laterally port of the vehicle 100, such as may be used to assess a distance buffer port component 144.

Each of the object sensor device 102 may implement respective functions to provide a collective object parameter detection based on respective spatial portions 118. For example, object sensor device 102-1 may operate to detect an object, and object sensor device 102-2 may operate to detect an object velocity relative to the vehicle 100. Also, object sensor device 102-3 may operate in combination with object sensor device 102-1 to corroborate a sensing and/or detection of an object. As may be appreciated, an object's velocity may be determined via an object sensor device, may be extrapolated by successive position detection measurements of the object, and calculating speed and/or direction of motion based thereon (such as to form a motion vector).

As may be appreciated, respective sets of object sensor devices may operate in combination with other sets of object sensor devices, may operate in an alternately or asynchronously, simultaneously, or individually based upon a desired sensing function and/or application.

In operation, the vehicle control unit 110 may operate to receive vehicle sensor data output by object sensor devices 102, which may provide a LIDAR system. The object sensor devices may capture and send vehicle sensor data related to laser returns from physical objects in the area surrounding the vehicle 100 while traveling at a velocity $V_{100}$, along the trajectory plan 134. As an example, signal returns may include vehicle route markings, such as a center line, lane lines, and edges of the vehicle route 134, traffic signage, etc.

As may be appreciated, with this vehicle sensor data, vehicle control unit 110 may operate to sense a vehicle travelling ahead, and transmitting via the antenna 112 a trajectory request for trajectory information of the vehicle. Based on a response by the vehicle to the trajectory request, the vehicle control unit 110 may determine a certainty estimate value for a trajectory of the preceding vehicle, and select a distance buffer 140 proportional to the certainty estimate value for the autonomous vehicle operation in relation to the vehicle. The vehicle control unit 110 may modify the trajectory plan 134 of the autonomous vehicle operation to produce a modified trajectory plan based on the distance buffer 140 for modifying the autonomous vehicle operation, as is discussed in detail with reference to FIGS. 2-5.

Figure 2:
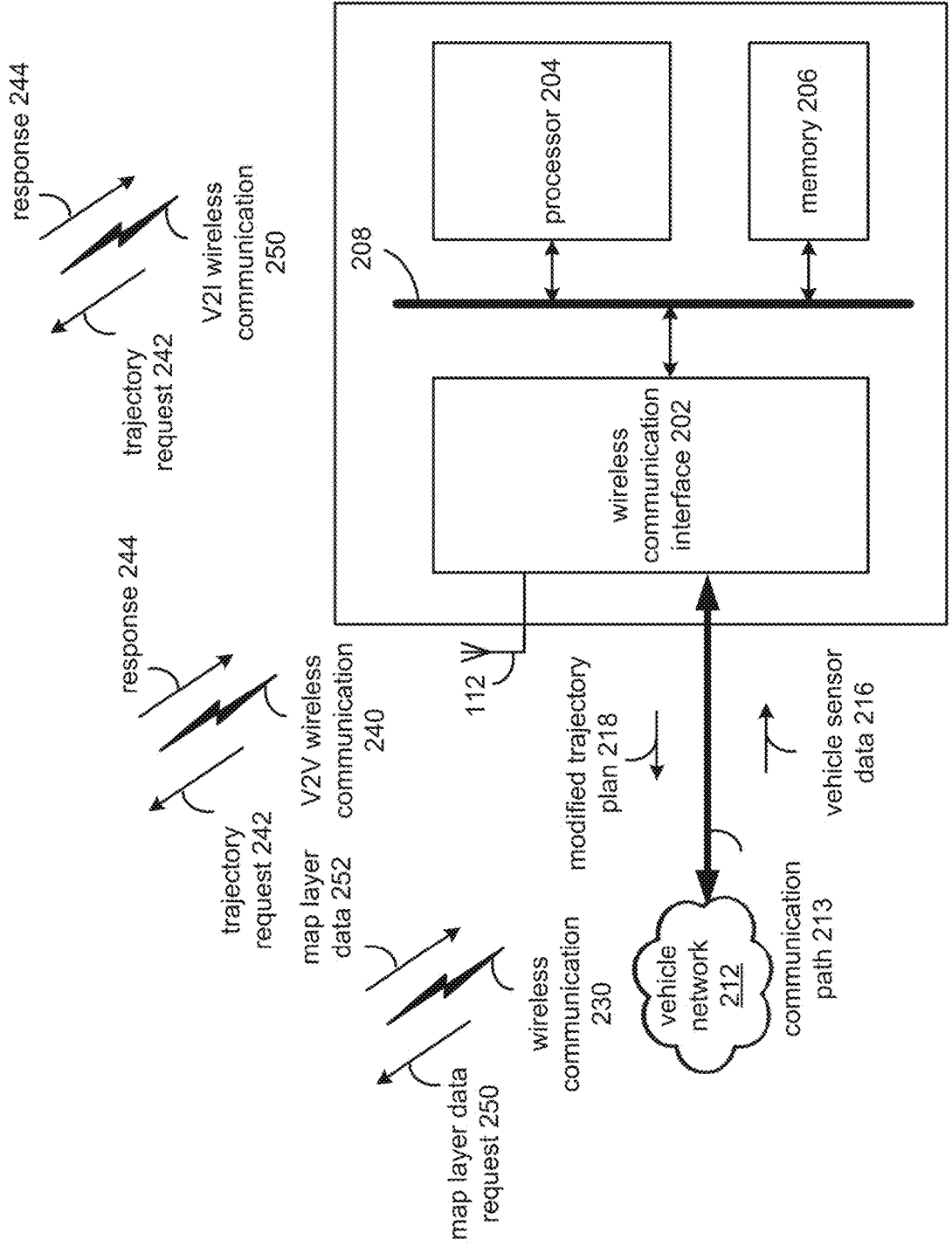
FIG. 2 is a block diagram of a vehicle control unit of FIG. 1.

FIG. 2 is a block diagram of a vehicle control unit 110, which includes a wireless communication interface 202, a processor 204, and memory 206, that are communicably coupled via a bus 208. The vehicle control unit 110 may provide an example platform for the device and methods described in detail with reference to FIGS. 1-5.

The processor 204 can be a conventional central processing unit or any other type of device, or multiple devices, capable of manipulating or processing information. As may be appreciated, processor 204 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions.

The memory (and/or memory element) 206 may be communicably coupled to the processor 204, and may operate to store one or more modules described herein. The modules can include instructions that, when executed, cause the processor 204 to implement one or more of the various processes and/or operations described herein.

The memory and/or memory element 206 may be a single memory device, a plurality of memory devices, and/or embedded circuitry of the processor 204. Such a memory device may be a read-only memory, random access memory, volatile memory, non-volatile memory, static memory, dynamic memory, flash memory, cache memory, and/or any device that stores digital information. Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium.

The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. In the context of this document, a computer-readable storage medium may be any tangible medium that can contain, or store a program for use by or in connection with an instruction execution system, apparatus, or device. Program code embodied on a computer-readable medium may be transmitted using any appropriate medium, including but not limited to wireless, wireline, optical fiber, cable, RF, etc., or any suitable combination of the foregoing.

The memory 206 is capable of storing machine readable instructions, or instructions, such that the machine readable instructions can be accessed by the processor 204. The machine readable instructions can comprise logic or algorithm(s) written in programming languages, and generations thereof, (e.g., 1GL, 2GL, 3GL, 4GL, or 5GL) such as, for example, machine language that may be directly executed by the processor 204, or assembly language, object-oriented programming (OOP) such as JAVA, Smalltalk, C++ or the like, conventional procedural programming languages, scripting languages, microcode, etc., that may be compiled or assembled into machine readable instructions and stored on the memory 206. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods and devices described herein may be implemented in any conventional computer programming language, as pre-programmed hardware elements, or as a combination of hardware and software components.

Note that when the processor 204 includes more than one processing device, the processing devices may be centrally located (e.g., directly coupled together via a wireline and/or wireless bus structure) or may be distributed located (e.g., cloud computing via indirect coupling via a local area network and/or a wide area network). Further note that when the processor 204 implements one or more of its functions via a state machine, analog circuitry, digital circuitry, and/or logic circuitry, the memory and/or memory element storing the corresponding operational instructions may be embedded within, or external to, the circuitry including the state machine, analog circuitry, digital circuitry, and/or logic circuitry.

Still further note that, the memory 206 stores, and the processor 204 executes, hard coded and/or operational instructions of modules corresponding to at least some of the steps and/or functions illustrated in FIGS. 1-5.

The vehicle control unit 110 can include one or more modules, at least some of which are described herein. The modules can be implemented as computer-readable program code that, when executed by a processor 204, implements one or more of the various processes described herein. One or more of the modules can be a component of the processor(s) 204, or one or more of the modules can be executed on and/or distributed among other processing systems to which the processor(s) 204 is operatively connected. The modules can include instructions (e.g., program logic) executable by one or more processor(s) 204.

The wireless communication interface 202 generally governs and manages the data received via a vehicle network 212. There is no restriction on the present disclosure operating on any particular hardware arrangement and therefore the basic features herein may be substituted, removed, added to, or otherwise modified for improved hardware and/or firmware arrangements as they may develop.

The antenna 112 may include one or more conductive elements that interact with electromagnetic signals transmitted by global positioning system satellites. The received signals may be transformed into a data signal indicative of the location (for example, latitude and longitude positions), and further indicative of the positioning of the vehicle with respect to road data.

The vehicle control unit 110 may be communicatively coupled to receive signals from global positioning system satellites, such as via the antenna 112 of the vehicle control unit 110, or other such vehicle antennae (not shown). The antenna 220 operates to provide communications with the vehicle control unit 200 through vehicle-to-vehicle (V2V) communications 240, through vehicle-to-infrastructure (V2I) communications 250, and wireless communication 230.

In vehicle-to-vehicle (V2V) communication 240, the vehicle 100 may message another vehicle, and the another vehicle may message the vehicle 100 through dedicated short-range radio communications to exchange messages. In the example provided by FIG. 2, the vehicle-to-vehicle communication 240 provides vehicle maneuvering information with a response 244 based on trajectory request 242, such as lane changes (e.g., traffic lane change command 240), speed increases, sudden stops, excessive slowing due to congestion brought on by excessive traffic, traffic signals, accidents, etc. Moreover, the vehicle-to-vehicle communications 240 may be in the form of a chain message passed wirelessly by other vehicles. In effect, the vehicle control unit 110 may receive advance notice, or indication, of a change in traffic congestion while on approach. Chain messages may be used in increasing "string stability" for a grouping of vehicles capable of vehicle-to-vehicle communications, as is discussed in detail with reference to FIGS. 3-5.

Vehicle-to-infrastructure communications 250 may operate to broadcast traffic stoppage points, such as a traffic light or a traffic sign, and provide advance indication to the vehicle control unit 110 of the likelihood of oncoming traffic congestion, as well as beacons and/or vehicle-to-infrastructure devices operable to gather local traffic information and local traffic congestion, and broadcast the gathered data. A V2I communication 250 may include data relating to traffic congestion levels such as red light violation warning data, curve speed warning data, stop sign gap assist data, reduced speed zone warning data, stop sign violation warning data; and railroad crossing violation warning data.

In operation, the vehicle control unit 110 may receive map layer data 252 in response to a map layer data request 250 via the antenna 112. Map layer data 252 may be provided by a third-party server operated by an organization that provides applications, such as a mapping application and map application layer data that includes roadway information data, traffic layer data, geolocation layer data, etc.

Map layer data 252 may include roadway data that may be utilized by the vehicle control unit 110 with the trajectory plan 134 (FIG. 1). For example, map layer data 252 may be provided in a Route Network Description File (RNDF) format. A Route Network Description File specifies, for example, accessible road segments and provides information such as waypoints, stop sign locations, lane widths, checkpoint locations, parking spot locations, etc. The route network has no implied start or end point. Servers such as server 233 may also provide data as Mission Description Files (MDF) for autonomous and/or driver-assist vehicle operation. A Mission Description Files (MDF) may operate to specify checkpoints to reach in a mission, such as along a travel route 134 (FIG. 1).

The wireless communication 226 may be based on one or many wireless communication system specifications. For example, wireless communication systems may operate in accordance with one or more standards specifications including, but not limited to, 3GPP (3rd Generation Partnership Project), 4GPP (4th Generation Partnership Project), 5GPP (5th Generation Partnership Project), LTE (long term evolution), LTE Advanced, RFID, IEEE 802.11, Bluetooth, AMPS (advanced mobile phone services), digital AMPS, GSM (global system for mobile communications), CDMA (code division multiple access), LMDS (local multi-point distribution systems), MMDS (multi-channel-multi-point distribution systems), IrDA, Wireless USB, Z-Wave, Zig-Bee, and/or variations thereof.

As may be appreciated, the communication path 213 of the vehicle network 212 may be formed from a medium suitable for transmitting a signal such as, for example, conductive wires, conductive traces, optical waveguides, or the like. Moreover, the communication path 213 can be formed from a combination of mediums capable of transmitting signals. In one embodiment, the communication path 213 may include a combination of conductive traces, conductive wires, connectors, and buses that cooperate to permit the transmission of electrical data signals to components such as processors, memories, sensors, input devices, output devices, and communication devices.

Accordingly, the communication path 213 may be provided by a vehicle bus, or combinations thereof, such as for example, a Body Electronic Area Network (BEAN), a Controller Area Network (CAN) bus configuration, an Audio Visual Communication-Local Area Network (AVC-LAN) configuration, a Local Interconnect Network (LIN) configuration, a Vehicle Area Network (VAN) bus, and/or other combinations of additional communication-system architectures to provide communications between devices and systems of the vehicle 100.

The term "signal" may be understood to relate to a waveform (e.g., electrical, optical, magnetic, mechanical or electromagnetic), such as DC, AC, sinusoidal-wave, triangular-wave, square-wave, vibration, and the like, capable of traveling through at least some of the mediums described herein.

Respective modules of the vehicle control unit 110, and associated instructions, when executed by the processor 204, cause the processor 204 to receive vehicle sensor data, and select an appearance mode of a plurality of appearance modes based on the vehicle sensor data in relation to a threshold value. When executed by the processor 204, the associated instructions cause the processor to apply appearance mode to virtual lane marker data to produce enhanced virtual lane marker data, and to transmit the enhanced virtual lane marker data for display by a vehicle graphic user interface via the wireless communication interface 202, as is discussed in detail with reference to FIGS. 3-5.

Figure 3:
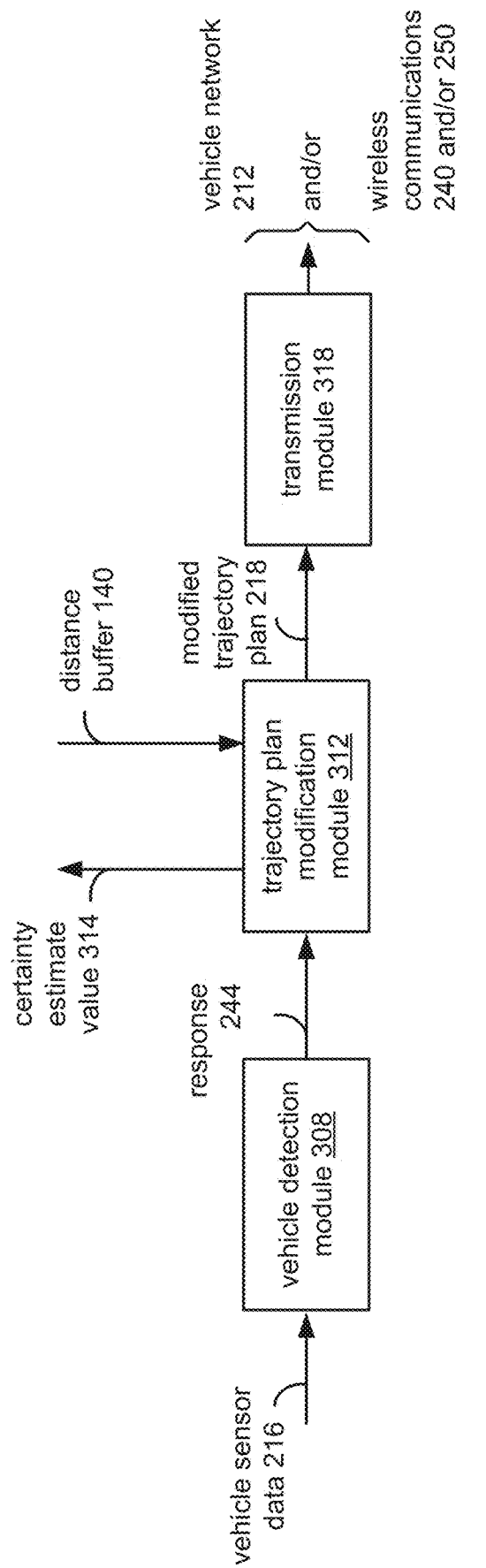
FIG. 3 illustrates a functional module block diagram stored in a memory for the vehicle control unit of FIG. 1.

FIG. 3 illustrates a functional module block diagram stored in a memory 206 (FIG. 2) of vehicle control unit 110, where memory 206 stores a vehicle detection module 308 and a trajectory modification module 312.

The vehicle detection module 308, via instructions that when executed by the processor, cause the processor to sense, based on vehicle sensor data, a vehicle travelling ahead in a direction of the autonomous vehicle, and transmit a trajectory request for trajectory information of the vehicle.

A vehicle control unit 110 (FIGS. 1 and 2) may receive a response 244. As may be appreciated, the response 244 may include a trajectory plan response that relates to a first certainty estimate value, a near real time trajectory response that relates to a second certainty estimate value, and a null response that relates to a third certainty estimate value.

A null response may include an NACK response, and a "none" response. For a NACK response, the vehicle ahead of the autonomous vehicle transmitting the trajectory request indicates a rejection of the request message (such as non-compatible communication protocols), and/or to indicate some kind of error (such as data within the request being corrupted, or directed to another addressee vehicle, etc.).

A "none" response indicates that the autonomous vehicle has silence in return from the vehicle ahead. Optionally, a trajectory request may be resent, or in the alternative, assess the vehicle ahead of the autonomous vehicle as a manually-operated vehicle having a low certainty level.

The vehicle detection module 308 may provide the response 244 to the trajectory plan modification module 312.

The trajectory plan modification module 312 includes instructions that, when executed by the processor, cause the processor to determine a certainty estimate value for a trajectory of the vehicle. As may be appreciated, the response 244 may include, for example, a trajectory plan response that relates to a first certainty estimate value, a near real time trajectory response that relates to a second certainty estimate value, and a null response that relates to a third certainty estimate value. The near real time trajectory response may include near real time operational parameters of the vehicle, such as at least one of vehicle heading data, vehicle speed data, vehicle lane control data, vehicle steering wheel angle data, and vehicle braking data.

Examples of the first, second, and third certainty estimates values may be understood to be coarse certainty estimate values. That is, a baseline certainty estimate value may be associated with different responses. As may be appreciated, the first, second and third certainty estimate values may be based on numerical values such as, for example, 100%, 50%, 0% certainty values, may be based on fuzzy logic values such as, for example, highly certain operation, less likely certain operation, unlikely certain operation, etc. and other suitable forms of logic implementation.

Fine certainty estimate values may be based on operational data that may be included with the responses to the trajectory request, as well as with observation via vehicle sensors of the vehicle ahead of the autonomous vehicle. For example, the response 244 may include speed data, steering wheel orientation data, braking data, etc., on which fine certainty estimate values may be generated in combination with coarse certainty estimates.

From a reference point of an autonomous vehicle, other autonomous vehicles may have high operational certainty levels. In contrast, a manually-operated vehicle may have a low operational certainty level, and a driver-assist operated vehicle may have varying certainty levels between autonomous operation and manual operation because of varying levels of information that may be conveyed to autonomous vehicles.

Manually-operated vehicle may have relatively high certainty estimate values (or high-uncertainty values) because future driving actions may not be readily discerned and/or discerned because of human nature. Human nature may further affect uncertainty because of the operator's driving experience, medical conditions, attentiveness, etc. Moreover, real-time, or near real-time, observations of a manually-operated vehicle may not necessarily translate to predictable trajectory plans from the viewpoint of an autonomous vehicle.

The vehicle may be also be a driver-assist operated vehicle that may include a varying second certainty estimate value. In this respect, a vehicle operator may be largely in control of the vehicle operation; however, the vehicle may include vehicle-to-vehicle communication capability to relay a trajectory plan, and also operational metric data (such as speed data, steering wheel orientation data, braking data, etc.), as well as vehicle operator data relating to an identified vehicle operator profile. For example, a vehicle operator may be identified by biometric data, electronic signature devices on the operator's person, etc., and matched with a vehicle profile. The vehicle operator profile, when present, may be conveyed with other operational data.

Based on the certainty estimate value 314, the trajectory plan modification module 312 may, based on the certainty estimate value 314, select a distance buffer 140 for the autonomous vehicle in relation to the vehicle. Based on the distance buffer 140, the trajectory plan modification module 312 may modify a trajectory plan 134 of the autonomous vehicle 100 (FIG. 1) to produce a modified trajectory plan 218 based on the distance buffer 140.

As may be appreciated, in a heterogeneous vehicle environment, the vehicle ahead of the autonomous vehicle may be not be an autonomous vehicle, and may include a certainty level as to vehicle behavior (such as perceived erratic driving, inability to hold a speed, frequent braking, etc).

When the response 244 may be a null response, the trajectory plan modification module 312 may operate to improve a certainty estimate value 314 based on observed operational characteristics of a preceding vehicle (or vehicle ahead). The trajectory plan modification module 312 may accordingly infer a trajectory plan for the vehicle based on speed, wheel direction, ability to remain within traffic lanes, etc, and producing therefrom a short-term inferred trajectory plan for a pre-determined forward-looking time period. Based on the inferred trajectory plan having an associated inferred certainty estimate value, the certainty estimate value 314 for the inferred trajectory plan and the response 244 may be generated. The trajectory plan modification module 312 may select a distance buffer 140 for the autonomous vehicle in relation to the preceding vehicle.

The distance buffer 140 generally relates to a following distance to a vehicle ahead. When certainty estimate values are favorable, autonomous and driver-assist operations may be implemented, such as for an adaptive cruise control (ACC), and cooperative adaptive cruise control (CACC) systems may be utilized to provide improved traffic flows. As may be appreciated, CACC systems may be provided via automated vehicle devices, as well as with driver-assisted vehicle devices. Moreover, such capability may be provided in other autonomous systems to account for manually-operated vehicles, and gauging autonomous system decisions based on certainty estimate values of other vehicles while operating in a heterogeneous vehicle environment.

Adaptive cruise control systems are assessed based on "string stability." That is, oscillations may be introduced into a traffic flow by a vehicle braking and accelerating, and then may be amplified in the upstream direction.

An adaptive cruise control device may also be referred to as active cruise control, autonomous cruise control, intelligent cruise control, radar cruise control, etc. In an adaptive cruise control device, distance may be measured by a vehicle object sensor 102 (FIG. 1).

In operation, a vehicle operator (such as in a driver-assist operation), may activate an adaptive cruise control device, and sets a desired speed. A vehicle operator may then select a desired distance buffer to a vehicle ahead (such as by pressing a button to cycle among short, medium, and long following distances).

Generally, adaptive cruise control systems do not have a high "string stability." Human drivers may have reduced string stability because human reaction times and actions, such as moving the foot from throttle to brake pedal, are delayed. An adaptive cruise control system may improve on this delay, but a phase delay occurs because of the estimation algorithm needed to translate the discrete range measurements (supplied by vehicle object sensor devices such as radar and/or LIDAR based) to a metric of change in range over time (that is, acceleration and deceleration of the preceding vehicle).

In comparison, a cooperative adaptive cruise control (CACC) system improves string stability by including wireless vehicle-to-vehicle communications and associated control logic to enhance vehicle-following capabilities of adaptive cruise control (ACC) systems. String stability may be improved by reducing the delay of the vehicles response to a preceding vehicle.

Vehicle-to-vehicle communications operate in a CACC system (such as in autonomous or higher-level driver-assist operations) provide information not limited to the vehicle immediately ahead of the vehicle, but also on a leading vehicle or vehicles further in front. That is, vehicle-to-vehicle communications relay key parameters such as position, velocity, acceleration, etc., of vehicles in the "string."

As may be appreciated, distance buffer 140 may be an agreed value between vehicles having vehicle-to-vehicle communications, and associated logic. With the introduction of manually-operated vehicles, or driver-assist vehicles with limited functionality, a vehicle 100 may operate to adjust a distance buffer 140 based on a certainty estimate value 314.

The modified trajectory plan 218 may be provided to a transmission module 318, for formatting for delivery to a vehicle network 212, and/or to other vehicles via wireless communication interface 202 via wireless communications 240 and/or 250.

Figure 4:
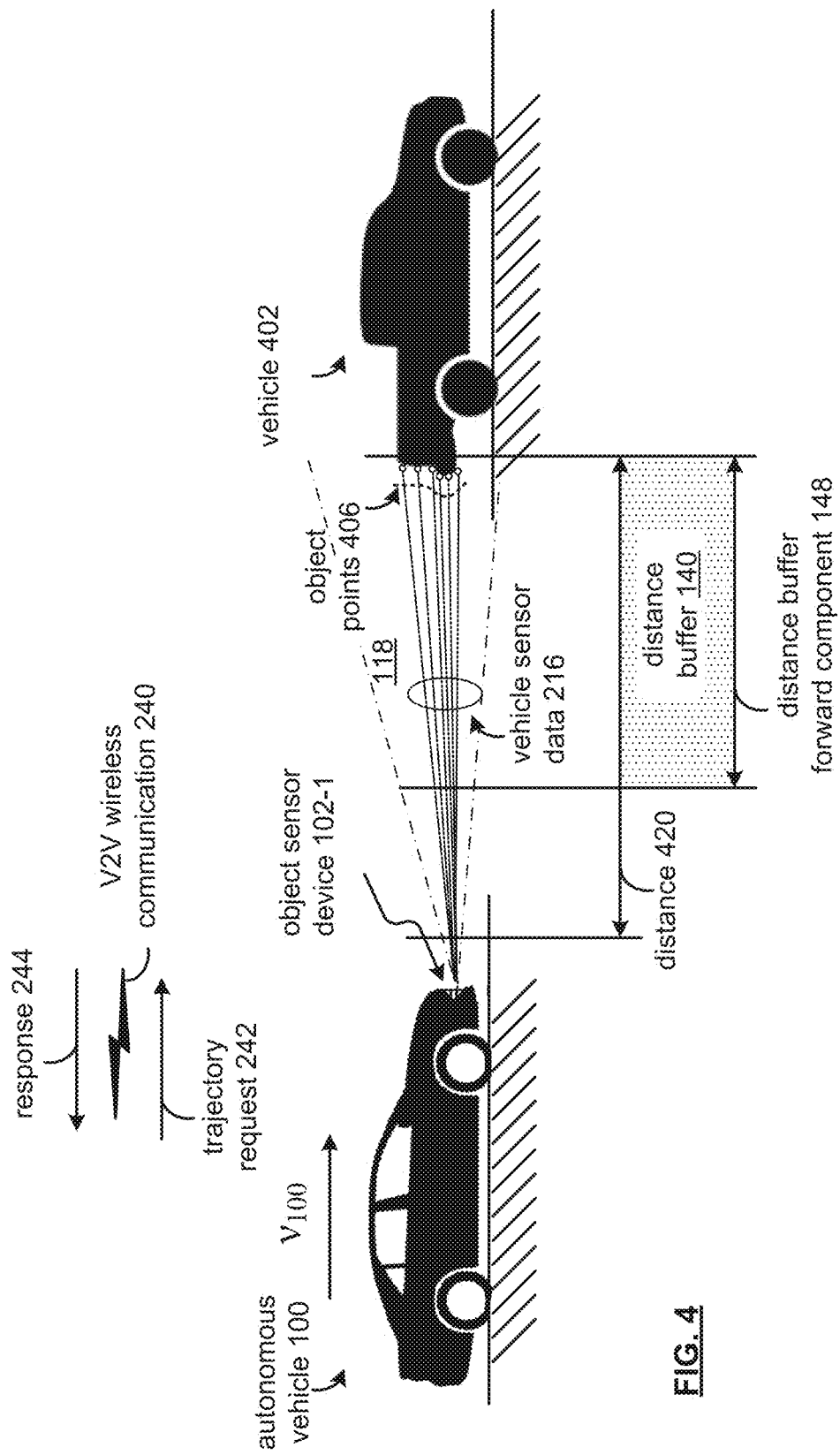
FIG. 4 illustrates an operational example sensing a preceding vehicle of a heterogeneous vehicle environment.

FIG. 4 illustrates an operational example of sensing a preceding vehicle 402 with an object sensor device 102-1 in a heterogeneous vehicle environment. For clarity, the example relates to a distance buffer forward component 148 of the distance buffer 140, with the understanding that the vehicle control unit 110 (FIG. 1) may operate similarly to select distance buffer aft, port, and starboard components (FIG. 1) of the distance buffer 140.

The vehicle 100, via the vehicle control unit 110 (FIG. 1), operates to sense the preceding vehicle 402 based on vehicle sensor data 216 based on object points 406 of the vehicle 402. The autonomous vehicle 100 may operate to transmit a trajectory request 242 for trajectory information of the vehicle 402. The vehicle 100 may receive a response to the trajectory request 242.

The vehicle control unit 110 (FIG. 1) of the vehicle 100 may operate to determine a certainty estimate value for a trajectory of the vehicle 402, and based on the certainty estimate value, select a distance buffer forward component 148 of a distance buffer 140 relating to the vehicle 402. As may be appreciated, the object sensor device 102-1 may operate to sense the vehicle 402 relating to a distance 420. The distance 420 generally relates to a sensor range for the object sensor device 102-1. Other distance buffer components 142, 144 and 146 (FIG. 1) of the distance buffer 140 may be selected as relating to vehicles that may positioned laterally, longitudinally, or a combination thereof, to the autonomous vehicle 100.

As may be appreciated, when the distance buffer forward component 148 for the distance buffer 140 may increase as the certainty estimate value decreases, and may decrease as the certainty estimate value increases. In this manner, more efficient traffic flows may be recognized in heterogeneous vehicle environments by accounting for various operational-state vehicles (such as autonomous, driver-assist, manually-operated, etc.).

As may be appreciated, in the example of a CACC (cooperative adaptive cruise control) system context, certainty estimate value relating to a vehicle may be communicated via the V2V wireless communication 240 to following vehicles. The following vehicles to the vehicle 100 may select respective distance buffers within the string to accommodate "certainty" estimations with respect to operation of the vehicle 402. As also may be appreciated, different autonomous and/or driver-assist vehicle models may have different operational characteristics. For examples, different manufacturers may each have different acceleration traits, braking traits, responsiveness, etc., that may be also considered in selecting a distance buffer 140.

Figure 5:
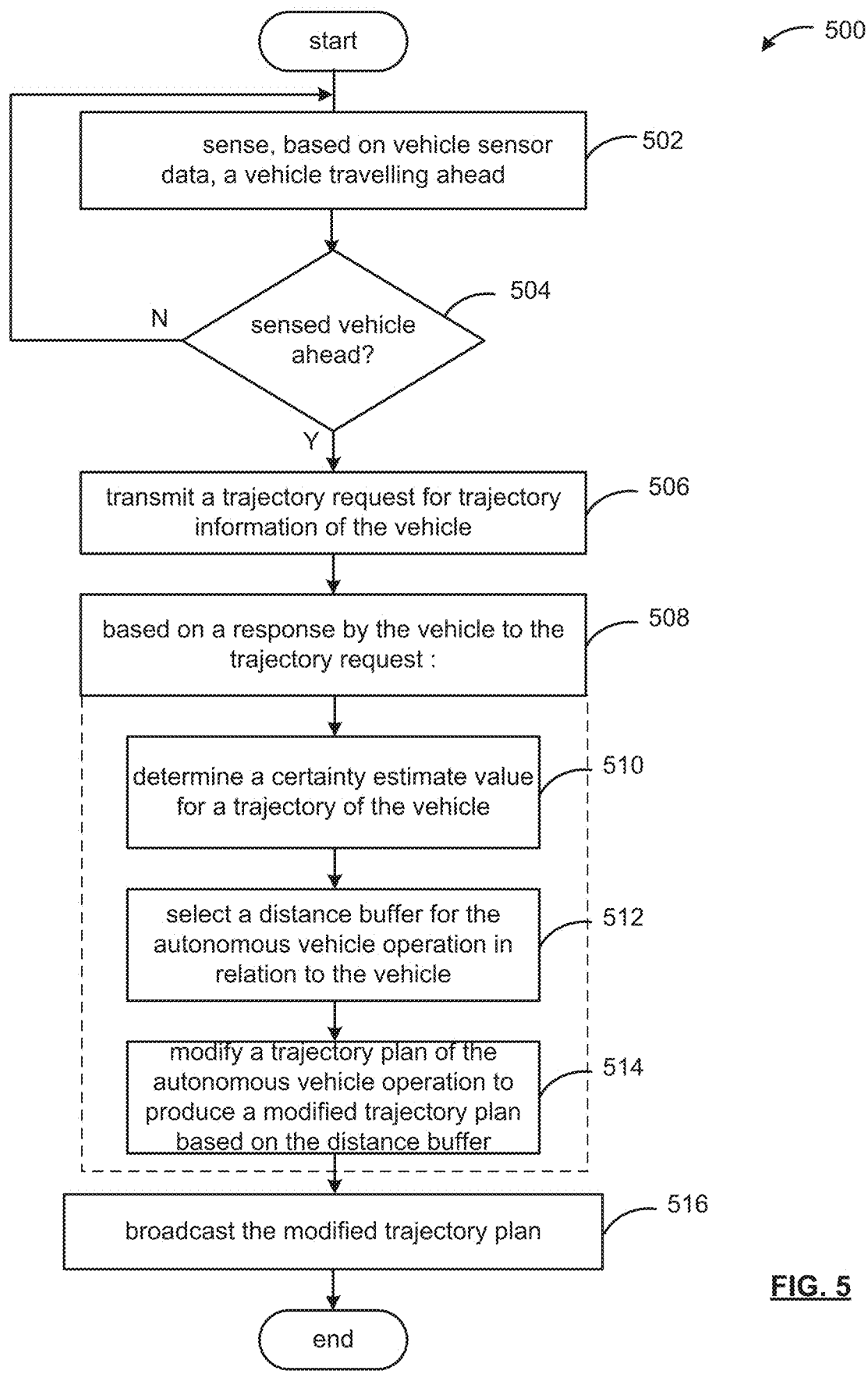
FIG. 5 is an example process for an autonomous operation in a heterogeneous vehicle environment.

FIG. 5 is an example process 500 for an autonomous operation in a heterogeneous vehicle environment. At operation 502, a vehicle control unit may sense, based on vehicle sensor data, a vehicle travelling ahead in a direction of the vehicle. When at operation 504, a vehicle is sensed preceding, or ahead, a trajectory request may be transmitted at operation 506. The trajectory request relates to trajectory information of the vehicle. Trajectory information may include a trajectory plan, vehicle speed, vehicle make, model, firmware installation, destination point, and trajectory point operations (such as slowing, stops, turns, accelerations, etc.) at various predetermined markers that may be located on GPS and/or mapping technologies.

Based on a response to the trajectory request at operation 508, a certainty estimate value for a trajectory of the vehicle is determined at operation 510. As may be appreciated, the response may include (a) a trajectory plan response that relates to a first certainty estimate value, (b) a near real time trajectory response that relates to a second certainty estimate value, and (c) a null response that relates to a third certainty estimate value. The near real time trajectory response including near real time operational parameters of the vehicle, such as at least one of vehicle heading data, vehicle speed data, vehicle lane control data, vehicle steering wheel angle data, and vehicle braking data.

A null response may include an NACK response, or a "none" response. For a NACK response, the vehicle ahead of the autonomous vehicle transmitting the trajectory request indicates a rejection of the request message (such as non-compatible communication protocols), and/or to indicate some kind of error (such as data within the request being corrupted, or directed to another addressee vehicle, etc.).

A "none" response indicates that the autonomous vehicle has silence in return from the vehicle ahead. Optionally, a trajectory request may be resent, or in the alternative, assess the vehicle ahead of the autonomous vehicle as a manually-operated vehicle having a low certainty level.

Examples of the first, second, and third certainty estimates values may be understood to be coarse certainty estimate values. That is, a baseline certainty estimate value may be associated with different responses. As may be appreciated, the first, second and third certainty estimate values may be based on numerical values such as, for example, 100%, 50%, 0% certainty values, may be based on fuzzy logic values such as, for example, highly certain operation, less likely certain operation, unlikely certain operation, etc. and other suitable forms of logic implementation.

Fine certainty estimate values may be based on operational data that may be included with the responses to the trajectory request, as well as with observation via vehicle sensors of the vehicle ahead of the autonomous vehicle. For example, the response 244 may include speed data, steering wheel orientation data, braking data, vehicle model data, communications protocol data, etc., on which fine certainty estimate values may be generated in combination with coarse certainty estimates.

From a reference point of an autonomous vehicle, other autonomous vehicles may have high operational certainty levels. In contrast, a manually-operated vehicle may have a low operational certainty level, and a driver-assist operated vehicle may have varying certainty levels between autonomous operation and manual operation because of varying levels of information that may be conveyed to autonomous vehicles.

Manually-operated vehicle may have relatively high certainty estimate values (or high-uncertainty values) because future driving actions may not be readily discerned and/or discerned because of human nature. Human nature may further affect uncertainty because of the operator's driving experience, medical conditions, attentiveness, etc. Moreover, real-time, or near real-time, observations of a manually-operated vehicle may not necessarily translate to predictable trajectory plans from the viewpoint of an autonomous vehicle.

The vehicle may be also be a driver-assist operated vehicle that may include a varying second certainty estimate value. In this respect, a vehicle operator may be largely in control of the vehicle operation; however, the vehicle may include vehicle-to-vehicle communication capability to relay a trajectory plan, and also operational metric data (such as speed data, steering wheel orientation data, braking data, etc.), as well as vehicle operator data relating to an identified vehicle operator profile. For example, a vehicle operator may be identified by biometric data, electronic signature devices on the operator's person, etc., and matched with a vehicle profile. The vehicle operator profile, when present, may be conveyed with other operational data.

With the certainty estimate value of operation 510, a distance buffer for the autonomous vehicle operation in relation to the vehicle may be selected at operation 512, and at operation 514, trajectory plan of the autonomous vehicle operation may be modified to produce a modified trajectory plan based on the distance buffer. As may be appreciated, modifications to the trajectory plan may "ripple" through to adjust times for changing lanes, engaging in vehicle maneuvers, arrival times to a destination, etc.

At operation 516, the modified trajectory plan may be broadcast to other vehicles. In this regard, vehicle-to-vehicle communications, vehicle-to-infrastructure communications, etc., may be used to convey the modified trajectory plan to other vehicles. In this respect, other vehicles with a capability for autonomous vehicle operation may correspondingly adjust respective trajectory plans, as well as further adjust a distance buffer with other vehicles of the heterogeneous vehicle environment.

While particular combinations of various functions and features of the present invention have been expressly described herein, other combinations of these features and functions are possible that are not limited by the particular examples disclosed herein are expressly incorporated within the scope of the present invention.

As one of ordinary skill in the art may appreciate, the term "substantially" or "approximately," as may be used herein, provides an industry-accepted tolerance to its corresponding term and/or relativity between items.

As one of ordinary skill in the art may further appreciate, the term "coupled," as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (that is, where one element is coupled to another element by inference) includes direct and indirect coupling between two elements in the same manner as "coupled."

As the term "module" is used in the description of the drawings, a module includes a functional block that is implemented in hardware, software, and/or firmware that performs one or more functions such as the processing of an input signal to produce an output signal. As used herein, a module may contain submodules that themselves are modules.

Thus, there has been described herein an apparatus and method, as well as several embodiments including a preferred embodiment, for implementing an autonomous vehicle operation in a heterogeneous vehicle environment.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretations so as to encompass all such modifications and equivalent structures as is permitted under the law.

What is claimed is:

1. A method for an autonomous vehicle operation in a heterogeneous vehicle environment, the method comprising:
   sensing, based on vehicle sensor data from the autonomous vehicle, a vehicle travelling ahead and in a direction of the autonomous vehicle;

transmitting a trajectory request for trajectory information of the sensed vehicle; and based on a response by the sensed vehicle to the trajectory request, the response being indicative of whether the sensed vehicle is one of a vehicle with a full set of autonomous vehicle operations, a vehicle with a partial set of autonomous vehicle operations and a manually operated vehicle:

determining a certainty estimate value for a trajectory of the sensed vehicle;

selecting a distance buffer proportional to the certainty estimate value for the autonomous vehicle operation in relation to the sensed vehicle; and modifying a trajectory plan of the autonomous vehicle operation to produce a modified trajectory plan based on the distance buffer for modifying the autonomous vehicle operation of the autonomous vehicle.

2. The method of claim 1, further comprising:
broadcasting the modified trajectory plan.

3. The method of claim 1, wherein the response to the trajectory request comprises at least one of:
a trajectory plan response including an expected trajectory for a predetermined forward-looking time period;
a near real time trajectory response including near real time operational parameters of the sensed vehicle; and
null response.

4. The method of claim 3, wherein:
the trajectory plan response relates a first certainty estimate value;
the near real time trajectory response relates a second certainty estimate value; and
the null response relates a third certainty estimate value.

5. The method of claim 1, wherein:
inferring a trajectory plan for the sensed vehicle based on the response and producing therefrom an inferred trajectory plan for a pre-determined forward-looking time period, wherein the inferred trajectory plan relates to a fine certainty estimate value;
determining the certainty estimate value for the inferred trajectory plan of the sensed vehicle based on a coarse certainty estimate value relating to the response and the fine certainty estimate value; and
selecting the distance buffer for the autonomous vehicle in relation to the sensed vehicle.

6. A method for an autonomous vehicle operation in a heterogeneous vehicle environment, the method comprising:
sensing, based on vehicle sensor data from the autonomous vehicle, a vehicle travelling ahead and in a direction of the autonomous vehicle;
transmitting a trajectory request for trajectory information of the sensed vehicle; and
based on a response by the sensed vehicle to the trajectory request:
determining a certainty estimate value for a trajectory of the sensed vehicle;
selecting a distance buffer proportional to the certainty estimate value for the autonomous vehicle operation in relation to the sensed vehicle; and
modifying a trajectory plan of the autonomous vehicle operation to produce a modified trajectory plan based on the distance buffer for modifying the autonomous vehicle operation of the autonomous vehicle;
wherein:
when the response to the trajectory request includes a null response, determine the certainty estimate value for the trajectory of the sensed vehicle by:
inferring a trajectory stability state of the sensed vehicle based on the vehicle sensor data from the autonomous vehicle;
determining the certainty estimate value for the trajectory of the sensed vehicle from the trajectory stability state; and
selecting the distance buffer for the autonomous vehicle in relation to the sensed vehicle.

7. A method for an autonomous vehicle operation in a heterogeneous vehicle environment, the method comprising:
sensing, based on vehicle sensor data of a lead autonomous vehicle of a plurality of vehicles under the autonomous vehicle operation, a vehicle travelling ahead and in a direction of the lead vehicle;
transmitting a trajectory request for trajectory information of the sensed vehicle; and
based on a response to the trajectory request by the sensed vehicle, the response being indicative of whether the sensed vehicle is one of a vehicle with a full set of autonomous vehicle operations, a vehicle with a partial set of autonomous vehicle operations and a manually operated vehicle:
determining a certainty estimate value for a trajectory of the sensed vehicle;
selecting a distance buffer for the lead autonomous vehicle in relation to the sensed vehicle; and
modifying a trajectory plan of the lead autonomous vehicle to produce a modified trajectory plan based on the distance buffer for broadcast to the plurality of vehicles.

8. The method of claim 7, further comprising:
broadcasting the modified trajectory plan to the plurality of vehicles.

9. The method of claim 7, wherein the response to the trajectory request comprises at least one of:
a trajectory plan response including an expected trajectory for a predetermined forward-looking time period;
a near real time trajectory response including near real time operational parameters of the sensed vehicle; and
null response.

10. The method of claim 9, wherein:
the trajectory plan response relates a first certainty estimate value;
the near real time trajectory response relates a second certainty estimate value; and
the null response relates a third certainty estimate value.

11. The method of claim 7, wherein:
inferring a trajectory plan for the sensed vehicle based on the response and producing therefrom an inferred trajectory plan for a pre-determined forward-looking time period, wherein the inferred trajectory plan relates to a fine certainty estimate value;
determining the certainty estimate value for the inferred trajectory plan of the sensed vehicle based on a coarse certainty estimate value relating to the response and the fine certainty estimate value; and
selecting the distance buffer for the autonomous vehicle in relation to the sensed vehicle.

12. The method of claim 7, wherein:
when the response to the trajectory request includes a null response, determine the certainty estimate value for the trajectory of the sensed vehicle by:
inferring a trajectory stability state of the sensed vehicle based on the vehicle sensor data from the autonomous vehicle;

determining the certainty estimate value for the trajectory of the sensed vehicle from the trajectory stability state; and selecting the distance buffer for the autonomous vehicle in relation to the sensed vehicle.

13. A vehicle control unit for an autonomous vehicle operation in a heterogeneous vehicle environment, the vehicle control unit comprising:
a wireless communication interface to service communication with a vehicle network;
a processor communicably coupled to the wireless communication interface and to a plurality of vehicle sensor devices; and
memory communicably coupled to the processor and storing:
a vehicle detection module including instructions that, when executed by the processor, cause the processor to:
sense, based on vehicle sensor data from an autonomous vehicle, a vehicle travelling ahead and in a direction of the autonomous vehicle;
transmit a trajectory request for trajectory information of the sensed vehicle; and
receive a response to the trajectory request, the response being indicative whether the sensed vehicle is one of a vehicle with a full set of autonomous vehicle operations, a vehicle with a partial set of autonomous vehicle operations and a manually operated vehicle; and
a trajectory plan modification module including instructions that, when executed by the processor, cause the processor to:
determine, based on the response, a certainty estimate value for a trajectory of the sensed vehicle;
select a distance buffer for the autonomous vehicle in relation to the sensed vehicle and the certainty estimate value; and
modify a trajectory plan of the autonomous vehicle to produce a modified trajectory plan based on the distance buffer.

14. The vehicle control unit of claim 13, further comprising:
a transmission module including instructions that, when executed by the processor, cause the processor to:
broadcast the modified trajectory plan.

15. The vehicle control unit of claim 13, wherein the response to the trajectory request comprises at least one of:
a trajectory plan response including an expected trajectory for a predetermined forward-looking time period;
a near real time trajectory response including near real time operational parameters of the sensed vehicle; and
null response.

16. The vehicle control unit of claim 15, wherein:
the trajectory plan response relates a first certainty estimate value;
the near real time trajectory response relates a second certainty estimate value; and
the null response relates a third certainty estimate value.

17. The vehicle control unit of claim 13, wherein the trajectory plan modification module including further instructions that, when executed by the processor, cause the processor to:
infer a trajectory plan for the sensed vehicle based on the response and producing therefrom an inferred trajectory plan for a pre-determined forward-looking time period, wherein the inferred trajectory plan relates to a fine certainty estimate value;
determine the certainty estimate value for the inferred trajectory plan of the sensed vehicle based on a coarse certainty estimate value relating to the response and the fine certainty estimate value; and
select the distance buffer for the autonomous vehicle in relation to the sensed vehicle.

18. A vehicle control unit for an autonomous vehicle operation in a heterogeneous vehicle environment, the vehicle control unit comprising:
a wireless communication interface to service communication with a vehicle network;
a processor communicably coupled to the wireless communication interface and to a plurality of vehicle sensor devices; and
memory communicably coupled to the processor and storing:
a vehicle detection module including instructions that, when executed by the processor, cause the processor to:
sense, based on vehicle sensor data from an autonomous vehicle, a vehicle travelling ahead and in a direction of the autonomous vehicle;
transmit a trajectory request for trajectory information of the sensed vehicle; and
receive a response to the trajectory request; and
a trajectory plan modification module including instructions that, when executed by the processor, cause the processor to:
determine, based on the response, a certainty estimate value for a trajectory of the sensed vehicle;
select a distance buffer for the autonomous vehicle in relation to the sensed vehicle and the certainty estimate value; and
modify a trajectory plan of the autonomous vehicle to produce a modified trajectory plan based on the distance buffer;
wherein the trajectory plan modification module includes further instructions that, when executed by the processor, cause the processor to:
when the response to the trajectory request includes a null response, determine the certainty estimate value for the trajectory of the sensed vehicle by:
inferring a trajectory stability state of the sensed vehicle based on the vehicle sensor data from the autonomous vehicle;
determining the certainty estimate value for the trajectory of the sensed vehicle from the trajectory stability state; and
selecting the distance buffer for the autonomous vehicle in relation to the sensed vehicle.

* * * * *